United States Patent [19]

Darwin et al.

[11] Patent Number: 5,393,343
[45] Date of Patent: Feb. 28, 1995

[54] CEMENT AND CEMENT COMPOSITION HAVING IMPROVED RHEOLOGICAL PROPERTIES

[75] Inventors: David C. Darwin, Columbia; Ellis M. Gartner, Silver Spring, both of Md.; Byong-Wa Chun; Hideo Koyata, both of Kanagawa, Japan; Lawrence L. Kuo, Columbus, Md.

[73] Assignee: W. R. Grace & Co.-Conn., New York, N.Y.

[21] Appl. No.: 128,939

[22] Filed: Sep. 29, 1993

[51] Int. Cl.$^6$ ............................................. C04B 24/12
[52] U.S. Cl. ................................... 106/808; 106/802; 106/823; 528/322; 524/2; 524/650; 526/262
[58] Field of Search ....................... 106/802, 808, 823; 528/322; 524/2, 650; 526/262

[56] References Cited

U.S. PATENT DOCUMENTS

| | | |
|---|---|---|
| 4,471,100 | 9/1984 | Trabakimoto et al. . |
| 4,589,995 | 5/1986 | Fukumoto et al. . |
| 4,745,159 | 5/1988 | Anzai et al. . |
| 4,946,904 | 8/1980 | Akimoto et al. . |
| 4,968,755 | 11/1990 | Canova et al. . |
| 5,142,036 | 8/1992 | Akimoto et al. . |
| 5,156,679 | 10/1992 | Gartner et al. ...................... 106/808 |
| 5,237,017 | 8/1993 | Akiyama et al. ...................... 526/262 |

FOREIGN PATENT DOCUMENTS

| | | |
|---|---|---|
| 0331052 | 2/1989 | European Pat. Off. . |
| 57-57706 | 4/1982 | Japan . |
| 58-147413 | 9/1983 | Japan . |
| 62-70250 | 3/1987 | Japan . |

*Primary Examiner*—Mark L. Bell
*Assistant Examiner*—Michael Marcheschi
*Attorney, Agent, or Firm*—Howard J. Troffkin

[57] ABSTRACT

An improved hydraulic cement and resultant hydraulic cement composition having an imidized acrylic polymer uniformly distributed therein.

12 Claims, No Drawings

CEMENT AND CEMENT COMPOSITION HAVING IMPROVED RHEOLOGICAL PROPERTIES

BACKGROUND OF THE INVENTION

The present invention is directed to an improved hydraulic cement and to a hydraulic cement composition having therein the subject improved-cement. Specifically, the present invention relates to an improved hydraulic cement composed of a mixture of an imidized acrylic polymer, as fully described below and hydraulic cement and to hydraulic cement compositions such as mortars and concrete which is capable of imparting high flowability to said compositions and of causing the treated composition to retain high flowability over a sustained period of time without imparting a significant delay in the initial set time for the composition.

Although increased flowability can be attained by using large dosages of water in a hydrating cement composition, it is well known that the resultant cement based structure will have poor compressive strength and related properties. Various additives have been proposed to increase the flowability (known as "slump") to cement composition, such as mortar and concrete compositions, without increasing the water content of the initially formed composition. Such additives have been classified as "cement superplasticizers" and include, for example, compounds, such as naphthalene sulfonate-formaldehyde condensates lignin sulfonates and the like.

More recently, copolymers of alkenyl-ethers and acrylic acid or maleic anhydride, and derivatives thereof, have been proposed as agents suitable to enhance slump [Japanese Patent Publication (Kokai) Nos 285140/88 and 163108/90]. Further, copolymers formed from the copolymerization of hydroxy-terminated allyether and maleic anhydride or the allyether and a salt, ester or amide derivative of maleic anhydride such as disclosed in U.S. Pat. No. 4,471,100 have been proposed as cement admixtures capable of enhancing slump.

In each of the above instances, the proposed cement admixture material when used in a cement composition does not provide the desired combination of properties or only provide them in low degrees. For example, esterified acrylate copolymers, while providing good slump enhancement, also causes the treated cement composition to exhibit excessive set retardation.

It is highly desired to have an admixture for cement compositions which is capable of imparting to the treated composition, a high degree of slump, of preventing a decrease in slump (decrease in flowability) over a sustained period of time, and at the same time, not causing the composition to exhibit excessive set retardation.

SUMMARY OF THE INVENTION

The present invention is directed to an improved hydraulic cement and to cement composition formed with said cement, wherein the cement contains an imidized acrylic polymer or copolymers thereof. The polymer can be represented by the general formula

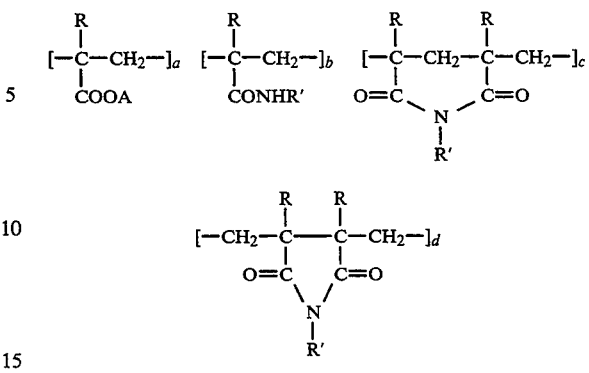

wherein each R independently represents hydrogen atom or a methyl ($CH_3-$) group; A represents a hydrogen atom, a $C_1-C_{10}$ alkyl group, R' or an alkali or alkaline earth metal cation or a mixture thereof; R' represents a hydrogen atom or a $C_2-C_{10}$ (preferably $C_2-C_4$) oxyalkylene group (BO) or a plurality (1–200, preferably from 1 to 70) of said groups which is terminated with a $C_1-C_{10}$ alkyl group (R'') or mixtures thereof; and a, b, c, and d represent molar percentages of the polymer's structure such that a has a value of about 50 to 70; the sum of c plus d is at least 2 to a value of $(100-a)$ and is preferably from 3 to 10; and b is not more than $[100-(a+c+d)]$.

Cement compositions formed with the improved cement of the present invention have been unexpectedly found to exhibit a high degree of slump over a sustained period of time while not having any significant set retardation.

DETAILED DESCRIPTION OF THE INVENTION

The present invention is directed to an improved cement and to cement compositions formed with said cement. The presently described improved cement has been unexpectedly found to provide a cement composition, such as mortar or concrete, having high flowability over an extended period of time without imparting a significant delay in the initial set time of the composition. Thus the presently achieved cement compositions are capable of being readily formed into a desired shape, having substantial self-leveling properties and can be worked over an extended period from commencement of hydration. At the same time, the present cement composition does not exhibit extensive delay in set and, therefore, does not delay the timetable for forming the desired structure.

The improved cement of the present invention is composed of a substantially uniform mixture of an imidized acrylic polymer, as fully described below, and a hydraulic cement. The cement can be selected from any conventional hydraulic cement such as, for example, normal portland cement (meeting the requirements of ASTM C-150), high early strength portland cement, ultra high early strength portland cement, blast-furnace slag cement, fly-ash cement, blended portland cements, calcium aluminate cements, calcium sulfate cements, magnesium phosphate cements and the like.

Imidized acrylic polymers have been unexpectedly found to enhance the cement and provide an improved product. The polymer which is imidized is an acrylic polymer The term "acrylic polymer", as used herein and in the appended claims is a homopolymer or copolymer of acrylic acid, methacrylic acid, their alkali metal salts as well as their $C_1$-$C_{30}$ alkyl esters. In addition, the acrylic polymer reactant and the resultant imidized acrylic polymer may contain units derived from other singly and doubly ethylenically unsaturated monomers, such as styrene, alpha-methylstyrene, sulfonated styrene, maleic acid, acrylonitrile, butadiene and the like. Such other ethylenically unsaturated monomer derived units, when present, can be present in the subject polymer in amount of up to about 20 (preferably, up to about 10) weight percent of the total polymer provided that the resultant imidized acrylic polymer is water soluble. Such other ethylenically unsaturated monomer derived units, although not shown in the structural formula exemplifying the subject imidized acrylic polymer, are contemplated to optionally be a part thereof.

The acrylic polymer found useful herein are low molecular weight polymers which are soluble in polar solvents such as water. They should be selected so that the resultant imidized acrylic polymer has a number average-molecular weight of from about 1,000 to 100,000, preferably from about 1,500 to 20,000. Acrylic polymers of both homopolymer and copolymer character, are formed by conventional free radical polymerization and are commercially available.

The imidized acrylic polymer is formed by reacting an acrylic polymer with ammonia or an alkoxylated amine. When an alkoxylated amine is used as a reactant, the imidization may be carried out neat, as the acrylic polymers are soluble in the amines. It is preferred to commence the imidization in the presence of small amounts of water.

The amine reactant useful in forming the desired imidized acrylic polymer can be selected from ammonia or an alkyl-terminated alkoxy amine represented by the formula:

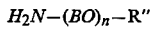

in which BO represents a $C_2$-$C_{10}$ (preferably a $C_2$-$C_4$) oxyalkylene group in which O represents an oxygen atom and B represents a $C_2$-$C_{10}$ (preferably $C_2$-$C_4$) alkylene group or mixture; and R'' represents a $C_1$-$C_{10}$ (preferably $C_1$-$C_4$) alkyl group and n is an integer selected from 1 to 200 preferably from 1 to 70.

The acrylic polymer and amine reactant form the desired imidized acrylic polymer by heating the reactants either in an aqueous solution or neat at elevated temperatures of from about 150° C. to 250° C. preferably from 170° C. to 200° C. under ambient pressure or, under a pressure lower than ambient pressure. Further, when the reaction is carried out under ambient or substantially ambient pressure it is preferred to conduct the reaction while passing air or nitrogen gas over the liquid reaction medium or by bubbling the gas through the medium to remove water and other low molecular weight by-products from the reaction zone.

The amine reactant is normally used in from about 5 to 90 mol percent and preferably from 10 to 20 mol percent based on the acrylic acid units present in the acrylic polymer.

The imidization reaction can be enhanced by conducting the reaction in the presence of a basic catalyst, an acid catalyst and/or a transamidation catalyst. Such catalysts may be selected from a tertiary amine, such as dicyclohexyl-amine, 1,1,3,3-tetramethylguanidine, 1,3-diphenylguanidine, quinoline, isoquinoline, 4-benzylpyridine, 4-phenylpyridine, 2,3-benzodiazine, 1,4-benzodiazine, 1-benzazine, 1,3-benzodiazine, N,N'-dicyclohexyl-carbodiimide, 2,2'-bipyridyl, 2,3'-bipyridyl, 2,4'-bipyridyl or such catalyst can be selected from the group consisting of HCl, $Sb_2O_3$, Ti-$(OC_4H_9)_4$, $NaNH_2$, $SnO_2$, potassium or sodium alkoxides, manganese acetate, and so forth. The catalyst can be present in amounts of from 0.1 to 5 weight percent based on the amine reactant.

The reactants are contacted with each other at the above described reaction conditions-for from about 1 to 8 hours and preferably from about 1.5 to 2.5 hours. During the course of the reaction, water (a by-product) is removed to drive the reaction to imidization.

Other known methods of imidization can be used provided the resultant polymer is of the molecular weight and degree of imidization and other characteristics, as described herein.

The imidized acrylic polymer found useful in the present invention, which may be formed in the manner described above, has a structural formula of:

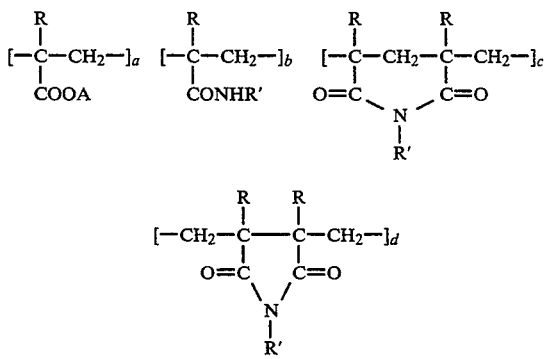

wherein each R independently represents hydrogen atom or a methyl ($CH_3$—) group; A represents a hydrogen atom, a $C_1$-$C_{10}$ alkyl group, R' or an alkali or alkaline earth metal cation or a mixture thereof; R' represents a hydrogen atom or a $C_2$-$C_{10}$ (preferably $C_2$-$C_4$) oxyalkylene group (BO) or a plurality (1-200, preferably from 1 to 70) of said groups which is terminated with a $C_1$-$C_{10}$ alkyl group (R'') or mixtures thereof; and a, b, c, and d represent molar percentages of the polymer's structure such that a has a value of about 50 to 70; the sum of c plus d is at least 2 to a value of (100−a) and is preferably from 3 to 10; and b is not more than [100−(a+c+d)].

The preferred imidized polymer is represented by the above formula in which A is a hydrogen atom or an alkali metal cation; R' is at least from 50 to 90 weight percent of the polymer and comprises polyoxyethylene or polyoxypropylene units or mixtures thereof. Further it is preferred that a is a numerical value of from 60-70, and the sum of c and d is a numerical value of at least 3 (preferably at least 5) to the value of (100−a).

The imidized acrylic polymer is normally a high-boiling viscous liquid which is substantially soluble in water. In most instances, the polymer is soluble in all proportions.

The improved cement of the present invention is composed of a substantially uniform mixture of the hydraulic cement and the imidized acrylic polymer which polymer should be present in from 0.005 to 5 (preferably from 0.03 to 1 and most preferably from 0.05 to 0.3) weight percent based on the weight of hydraulic cement. In order to aid in forming the uniform mixture, the imidized acrylic polymer can be mixed with the cement as an aqueous solution having from about 30 to 50 weight percent imidized acrylic polymer solids in the solution.

The imidized acrylic polymer treated cement can be formed at any stage of the cement's formation or use. For example, the polymer can be mixed at the cement mill with clinker cement raw material during its grinding to form cement powder. It can also be applied to the cement powder during its blending with other dry materials to prepare a specific type of cement, such as blended cement, pozzolanic cement and the like.

Alternately, the improved cement can be formed in situ during the course of preparing a cement composition such as a mortar mix (hydraulic cement, sand and water) or a concrete (hydraulic cement, sand, large aggregate, such as stone, and water). The instant imidized acrylic polymer can be added (conventionally as a aqueous solution) as part of the water of hydration or can be added separately. In the later method of application, the water of the aqueous polymer solution should be calculated as part of the total water content of the cement composition.

As stated above, the imidized acrylic polymer of the improved cement (whether as a dry blend of cement and polymer or as formed in situ as part of the formation of a wet unset cement composition) should be from 0.005 to 5, preferably from 0.03 to 1 and most preferably from 0.05 to 0.3 weight percent of solid imidized acrylic polymer based on the weight of solid hydraulic cement of the cement composition.

Cement compositions formed with the present improved cement have a significantly higher degree of flowability (higher degree of slump), than compositions formed with conventional hydraulic cement. Further, the present cement compositions are capable of retaining their high degree of slump over a sustained period of time giving the artisan an extended period to work the cement composition into its final shape. Finally, the present cement composition achieves initial set without exhibiting excessive retardation. Thus, the use of this cement composition does not cause delay of the working time required to form a particular structure.

Conventional cement additives, such as air entrainers, water proofing agents, strength enhancers, corrosion inhibitors, antifoaming agents and curing accelerators can be used with the subject cement additive. These additives can be mixed with the cement composition prior to, along with or subsequent to the addition of the present cement additive.

The present invention is further explained by the following examples which are given for illustrative purposes only and are not meant to limit the invention, as defined by the claims, appended hereto. All parts and percentages are by weight unless otherwise stated.

EXAMPLES

EXAMPLE 1

40 parts of solid polyacrylic acid of 5000 molecular weight was added to 60 parts of a polyethylene—polypropylene oxide polymer of molecular weight 700 which is terminated at one end with a primary amine group and at the other end by a methyl group. The reaction mixture was stirred for 30 minutes at ambient temperature followed by 1 hour and 10 minutes at 180° C. under a blanket of flowing nitrogen gas. The water by-product was removed in the nitrogen gas stream. The resultant product was a viscous amber liquid. The liquid was analyzed by infrared spectroscopy and the resultant spectra had peaks at 1720 cm$^{-1}$, 1630 cm$^{-1}$ and 750 cm$^{-1}$, which indicates the presence of imide groups. This liquid was also analyzed by conductiometric titration and the nitrogen linkages were found to have an 4:1 amide:imide group ratio.

EXAMPLE 2

7.5 parts of solid polyacrylic acid of 2000 molecular weight was dissolved in 7.7 parts deionized water. To this resultant solution was added 52.1 parts of a polyethylene-polypropylene oxide polymer of molecular weight 2000 which was terminated at one end by a primary amine group and at the other end by a methyl group. The mixture was heated and maintained at 180° C. under a flowing nitrogen gas blanket for a total of 2 hours to remove the water of solution and that formed as a reaction by-product. The resulting product was an amber viscous liquid.

EXAMPLE 3

25 parts of a 50% aqueous solution of a polyacrylic acid of 5000 molecular weight was combined with 52 parts of a polyethylene-polypropylene oxide polymer of molecular weight 2000 which was terminated at one end by a primary amine group and at the other end by a methyl group. The mixture was heated and maintained at 180° C. while under flowing nitrogen gas stream for a total of 2 hours. The water of solution and formed as by-product was removed in the nitrogen gas stream. The resulting product was an amber viscous liquid.

EXAMPLE 4

30 parts of a 65% aqueous solution of a polyacrylic acid of 2000 molecular weight was mixed with 29.3 parts of a (polyethylene-polypropylene) oxide polymer of molecular weight 700 which was terminated at one end by a primary amine group and at the other end by a methyl group. The mixture was heated under flowing blanket of nitrogen gas at 180° C. for 1 hour and 30 minutes. The water of the solution and from the reaction was removed by the nitrogen gas stream. The resulting product was an amber viscous liquid.

EXAMPLE 5

19.2 parts of a 65% aqueous solution of a polyacrylic acid of 2000 molecular weight was combined with 3.0 parts of 30% aqueous solution of ammonia. To the solution was then added 48 parts of a polyethylene-polypropylene oxide polymer of molecular weight 700 which was terminated at one end by a primary amine group and at the other end by a methyl group. The mixture was heated and maintained at 180° C. while under flowing nitrogen gas stream for a total of 30 minutes. The water of the solution and that formed as a by-product was removed in the nitrogen stream. A yellow creamy liquid was isolated as the product and was determined to contain both reacted ammonia and alkoxyamine groups.

EXAMPLE 6

154 parts of a 50% solution in water of polyacrylic acid of 2000 molecular weight was added to 312 parts of a polyethylene-polypropylene oxide polymer of molecular weight 2000 which was terminated at one end by a primary amine group at the other end by a methyl group. The mixture was heated and maintained at 180° C. under flowing nitrogen gas stream for a total of 7 hours until substantially all of the water was removed. The resulting product was an amber viscous liquid.

EXAMPLE 7

5.2 parts of a polymethacyrlic acid of molecular weight 3400 was dissolved in 8.2 parts of distilled water. After 45 minutes, the polymethacrylic acid was completely dissolved and 18.0 parts of a polyethylene-polypropylene oxide polymer of molecular weight 2000 terminated at one end by a primary amine and terminated at the other end by a methyl group was added. The mixture was stirred at room temperature for 30 minutes. Heat was applied at 180° C. under flowing nitrogen for 1 hour. The resulting product was an amber viscous liquid.

A sample of the resultant imidized acrylic polymer was tested as part of an ordinary portland cement mortar in a method based on Japanese Industrial Standard (JIS) A6204. A sand/cement/water ratio of 1/3/0.50 was used with the polymer dissolved in the water to give a dosage of 0.15% solid polymer based on solid cement (s/s). In order to eliminate the effects of air on the flow of the mortar, a commercial defoamer was employed at 20–30 ppm based on the weight of cement. Set times were measured using an automated penetrometer on a sample formed using 0.20% s/s dosage of polymer. Results of these tests are given in Table 3 below.

EXAMPLE 8

Each of the formed imidized acrylic polymers of Examples 1,3,4,5 and 6 were formed into 50% aqueous solutions with deionized water. Each of the solutions was used in forming a cement composition composed of standard hydraulic portland cement and water. The polymer to cement weight ratio (solid polymer/solid cement, s/s) was 0.002 and the water to cement ratio was 0.5. A miniature slump test developed by Kantro as described in "Cement, Concrete and Aggregates"' Vol. 2, No. 2, Page 95 1980 was used to measure slump of each sample. Set was measured by an automated penetrometer. The results for samples of Examples 2–6 are given in Table 1 below. Further, samples of a concrete cement composition were treated with the imidized acrylic polymer of Example 6 and, for comparative purposes, with a conventional-concrete superplasticizing agent, naphthalene sulfonate formaldehyde condensate ("NSFC"), in dosages set forth in Table 2 below. The concrete mix design was composed of: portland cement at a rate of 600 lbs/yd³; sand at a rate of 1400 lbs/yd³; coarse aggregate (crushed stone) at a rate of 1700 lbs/yd³ and water (including from admixture) in 300 lbs/yd³. These samples and a blank were tested according to ASTM C143 for slump, ASTM C403 for set, and ASTM C39 for compressive strength. A commercial defoamer was also incorporated to eliminate air effects on slump and compressive strength. The results of these tests are given in Table 2 below.

TABLE 1

Cement Paste Results

| Preparation | Dosage (% s/s) | Minislump spread (cm) 9 min. | 18 min. | 30 min. | 45 min. | 60 min. | Set time (min.) |
|---|---|---|---|---|---|---|---|
| Blank | — | 14.9 | 13.9 | 12.6 | 10.9 | 10.0 | 187 |
| Example 2 | 0.2 | 19.8 | 20.4 | 20.0 | 19.3 | 18.3 | 327 |
| Example 3 | 0.2 | 20.7 | 24.4 | 22.3 | 20.4 | 18.4 | 334 |
| Example 4 | 0.2 | 18.1 | 18.5 | 18.8 | 17.5 | 16.5 | 342 |
| Example 5 | 0.2 | 18.7 | 20.2 | 17.6 | 17.5 | 16.6 | 288 |
| Example 6 | 0.2 | 21.6 | 20.9 | 22.0 | 18.9 | 18.9 | 287 |

TABLE 2

Concrete Results

| Preparation | Dosage (% s/s) | Slump (in. at 9 min.) | (in. at 18 min.) | (in. at 30 min.) | (in. at 45 min.) | Set (hr:min) | Compressive Strength 1 day (psi) | 7 day (psi) | 28 day (psi) |
|---|---|---|---|---|---|---|---|---|---|
| Blank | — | 2.75 | NM | NM | NM | 4:20 | 1782 | 5140 | 6097 |
| Example 6 | 0.125 | 8.00 | 7.25 | 5.25 | 3.00 | 4:14 | 2012 | 5182 | 6442 |
| NSFC | 1.00 | 8.00 | 5.50 | 3.25 | 2.50 | 5:23 | 1683 | 3641 | 5872 |

The results of Table 2 clearly show that the present imidized acrylic polymer admixture containing cement composition provides a high initial slump, retains a high slump over a sustained period, has substantially no set retardation and exhibits enhanced compressive strength when compared to the untreated cement composition and to a cement composition containing a conventional superplasticizer, NSFC.

TABLE 3

Mortar Flow Results

| Preparation | Dosage (% s/s) | Flow 4 min. (mm) | 30 min. (mm) | 60 min. (mm) | Set[1] (hr:min) |
|---|---|---|---|---|---|
| Blank | — | 105 | NM | NM | 5:00 |
| Example 7 | 0.15 | 220 | 197 | 163 | 5:30 |

[1]Set measured at 0.20% s/s of Example 7.

What is claimed:

1. An improved cement comprising a mixture of a hydraulic cement and from 0.01 to 2 weight percent based on the weight of said hydraulic cement of an imidized acrylic polymer represented by the structure of:

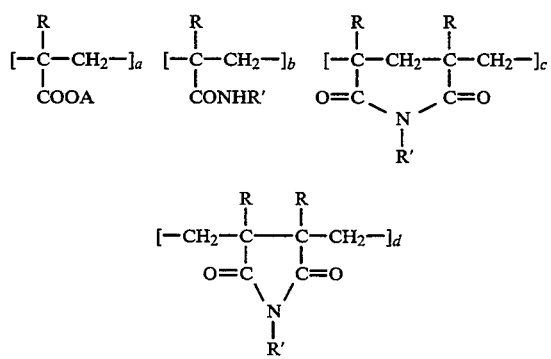

wherein each R independently represents a hydrogen atom or a methyl ($CH_3$—) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_nR''$ in which O represents an oxygen atom, B represents a $C_2$–$C_{10}$ alkylene group, R'' represents a $C_1$–$C_{10}$ alkyl and n represents an integer of from 1–200, or mixtures thereof; and a, b, c and d are numerical values representing molar percentage of the polymer's structure such that a is a value of about 50 to 70; the sum of c+d is a value of from about 2 to the numerical value of (100−a); and b is a remainder value of [100−(a+c+d)].

2. The improved cement of claim 1 wherein B represents a $C_2$–$C_3$ alkylene group or mixture thereof and R'' represents a $C_1$–$C_3$ alkyl group.

3. The improve cement of claim 1 wherein R' represents hydrogen atom.

4. The improved cement of claim 1 wherein R' represents a chain represented by $(BO)_nR''$ in which O represents an oxygen atom, B represents a $C_2$–$C_3$ alkylene group or mixture of said groups and R'' represents a $C_1$–$C_3$ alkyl group and n represents an integer of from 1 to 70.

5. The improved cement of claim 1 wherein a represents an integer of 60-70 and the sum of c+d is an integer of at least 5 to the numerical value of (100−a).

6. The improved cement of claim 5 wherein R' represents a plurality of from 1 to 70 units of oxyalkylene groups terminated with a $C_1$–$C_3$ alkyl group.

7. In an improved composition comprising a mortar formed from a mixture of a hydraulic cement, sand and water or a concrete formed from a mixture of hydraulic cement, sand, large aggregate and water, wherein the improvement comprises utilizing a hydraulic cement of claim 1.

8. In an improved composition comprising a mortar formed from a mixture of a hydraulic cement, sand and water or a concrete formed from a mixture of hydraulic cement, sand, large aggregate and water, wherein the improvement comprises utilizing a hydraulic cement of claim 2.

9. In an improved composition comprising a mortar formed from a mixture of a hydraulic cement, sand and water or a concrete formed from a mixture of hydraulic cement, sand, larger aggregate and water, wherein the improvement comprises utilizing a hydraulic cement of claim 3.

10. In an improved composition comprising a mortar formed from a mixture of a hydraulic cement, sand and water or a concrete formed from a mixture of hydraulic cement, sand, large aggregate and water, wherein the improvement comprises utilizing a hydraulic cement of claim 4.

11. In an improved composition comprising a mortar formed from a mixture of a hydraulic cement, sand and water or a concrete formed from a mixture of hydraulic cement, sand, large aggregate and water, wherein the improvement comprises utilizing a hydraulic cement of claim 5.

12. In an improved composition comprising a mortar formed from a mixture of a hydraulic cement, sand and water or a concrete formed from a mixture of hydraulic cement, sand, large aggregate and water, wherein the improvement comprises utilizing a hydraulic cement of claim 6.

* * * * *